US012566823B2

(12) United States Patent
Tiong et al.

(10) Patent No.: US 12,566,823 B2
(45) Date of Patent: Mar. 3, 2026

(54) SYSTEMS AND METHODS FOR INTERPOLATIVE CENTROID CONTRASTIVE LEARNING

(71) Applicant: Salesforce, Inc., San Francisco, CA (US)

(72) Inventors: Anthony Meng Huat Tiong, Singapore (SG); Junnan Li, Singapore (SG); Chu Hong Hoi, Singapore (SG)

(73) Assignee: Salesforce, Inc., San Francisco, CA (US)

( * ) Notice: Subject to any disclaimer, the term of this patent is extended or adjusted under 35 U.S.C. 154(b) by 1217 days.

(21) Appl. No.: 17/188,232

(22) Filed: Mar. 1, 2021

(65) Prior Publication Data

US 2022/0156530 A1 May 19, 2022

Related U.S. Application Data

(60) Provisional application No. 63/113,393, filed on Nov. 13, 2020.

(51) Int. Cl.
| | |
|---|---|
| *G06F 18/2413* | (2023.01) |
| *G06F 18/214* | (2023.01) |
| *G06F 18/2415* | (2023.01) |
| *G06N 3/084* | (2023.01) |

(52) U.S. Cl.
CPC ...... *G06F 18/24137* (2023.01); *G06F 18/214* (2023.01); *G06F 18/2415* (2023.01); *G06N 3/084* (2013.01)

(58) Field of Classification Search
CPC ............. G06F 18/24137; G06F 18/217; G06F 18/2415
See application file for complete search history.

(56) References Cited

U.S. PATENT DOCUMENTS

| | | | |
|---|---|---|---|
| 8,784,318 B1* | 7/2014 | Napolitano | G06T 7/97 73/620 |
| 2018/0260793 A1* | 9/2018 | Li | G06T 19/20 |
| 2020/0302340 A1* | 9/2020 | Durand | G06N 3/045 |

(Continued)

OTHER PUBLICATIONS

Large Scale Long Tailed recognition in an open world Liu et al. pp. 2537-2546, Apr. 16, 2019 (Year: 2019).*

(Continued)

*Primary Examiner* — Sherrod L Keaton

(74) *Attorney, Agent, or Firm* — Haynes and Boone, LLP

(57) ABSTRACT

An interpolative centroid contrastive learning (ICCL) framework is disclosed for learning a more discriminative representation for tail classes. Specifically, data samples, such as natural images, are projected into a low-dimensional embedding space, and class centroids for respective classes are created as average embeddings of samples that belong to a respective class. Virtual training samples are then created by interpolating two images from two samplers: a class-agnostic sampler which returns all images from both the head class and the tail class with an equal probability, and a class-aware sampler which focuses more on tail-class images by sampling images from the tail class with a higher probability compared to images from the head class. The sampled images, e.g., images from the class-agnostic sampler and images from the class-aware sampler may be interpolated to generate interpolated images.

20 Claims, 11 Drawing Sheets

(56) References Cited

U.S. PATENT DOCUMENTS

| | | | | |
|---|---|---|---|---|
| 2021/0326660 A1* | 10/2021 | Krishnan | ............. | G06V 10/761 |
| 2021/0327029 A1* | 10/2021 | Chen | ......................... | G06T 3/60 |

OTHER PUBLICATIONS

Generative adversarial interpolative autoencoding: adversarial training on latent space interpolations encourage convex latent distributions, pp. 1-10, Jul. 17, 2018 Sainburg et al. (Year: 2018).*
Large Scale Long Tailed recognition in an open world Liu et al. pp. 2537-2546, Apr. 16, 2019.*
Generative adversarial interpolative autoencoding: adversarial training on latent space interpolations encourage convex latent distributions, pp. 1-10, Jul. 17, 2018 Sainburg et al.*

* cited by examiner

400

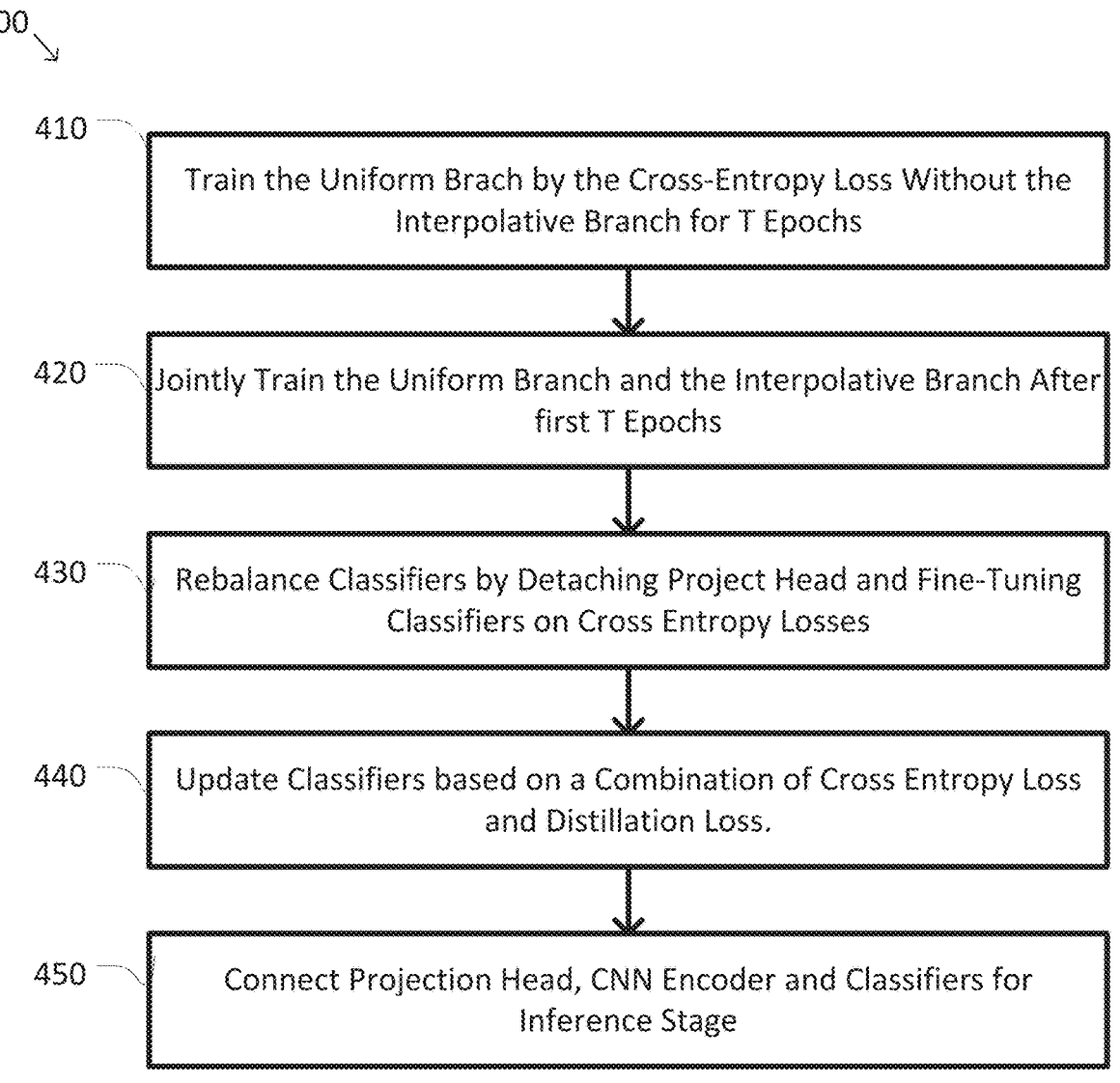

410 — Train the Uniform Brach by the Cross-Entropy Loss Without the Interpolative Branch for T Epochs 420 — Jointly Train the Uniform Branch and the Interpolative Branch After first T Epochs 430 — Rebalance Classifiers by Detaching Project Head and Fine-Tuning Classifiers on Cross Entropy Losses 440 — Update Classifiers based on a Combination of Cross Entropy Loss and Distillation Loss.

450 — Connect Projection Head, CNN Encoder and Classifiers for Inference Stage

*FIG. 4*

| Dataset | Long-tailed CIFAR100 | | | Long-tailed CIFAR10 | | |
|---|---|---|---|---|---|---|
| Imbalance ratio | 100 | 50 | 10 | 100 | 50 | 10 |
| CE* | 38.3 | 43.9 | 55.7 | 70.4 | 74.8 | 86.4 |
| Focal Loss* | 38.4 | 44.3 | 55.8 | 70.4 | 76.7 | 86.7 |
| Mixup* | 39.5 | 45.0 | 58.0 | 73.1 | 77.8 | 87.1 |
| Manifold Mixup* | 38.3 | 43.1 | 56.6 | 73.0 | 78.0 | 87.0 |
| Manifold Mixup (two samplers)* | 36.8 | 42.1 | 56.5 | 73.1 | 79.2 | 86.8 |
| CB-Focal* | 39.6 | 45.2 | 58.0 | 74.6 | 79.3 | 87.1 |
| CE-DRW* | 41.5 | 45.3 | 58.1 | 76.3 | 80.0 | 87.6 |
| CE-DRS* | 41.6 | 45.5 | 58.1 | 75.6 | 79.8 | 87.4 |
| LDAM-DRW* | 42.0 | 46.6 | 58.7 | 77.0 | 81.0 | 88.2 |
| cRT† | 42.3 | 46.8 | 58.1 | 75.7 | 80.4 | 88.3 |
| LWS† | 42.3 | 46.4 | 58.1 | 73.0 | 78.5 | 87.7 |
| BBN | 42.6 | 47.0 | 59.1 | 79.8 | 82.2 | 88.3 |
| M2m | 43.5 | - | 57.6 | 79.1 | - | 87.5 |
| De-confound-TDE | 44.1 | 50.3 | 59.6 | 80.6 | 83.6 | 88.5 |
| ICCL (1st stage, γ = 0) | 43.1 | 48.6 | 60.5 | 74.7 | 79.8 | 88.7 |
| ICCL (2nd stage, γ = 0) | 46.6 | 51.6 | 62.1 | 82.1 | 84.7 | 89.7 |
| ICCL (1st stage, γ = 0.5) | 43.5 | 48.7 | 61.1 | 75.0 | 81.2 | 88.3 |
| ICCL (2nd stage, γ = 0.5) | 46.2 | 51.2 | 62.0 | 81.6 | 84.7 | 89.5 |

*FIG. 5*

| Method | Overall | Many | Medium | Few |
|---|---|---|---|---|
| OLTR* | 41.9 | 51.0 | 40.8 | 20.8 |
| Focal Loss* | 43.7 | 64.3 | 37.1 | 8.2 |
| Joint | 44.4 | 65.9 | 37.5 | 7.7 |
| NCM | 47.3 | 56.6 | 45.3 | 28.1 |
| $\tau$-norm | 49.4 | 59.1 | 46.9 | 30.7 |
| cRT | 49.6 | 61.8 | 46.2 | 27.4 |
| LWS | 49.9 | 60.2 | 47.2 | 30.3 |
| De-confound-TDE | 51.8 | 62.7 | 48.8 | 31.6 |
| Joint† | 46.7 | 68.1 | 40.2 | 9.0 |
| cRT† | 52.4 | 64.3 | 49.1 | 30.7 |
| LWS† | 52.5 | 63.0 | 49.6 | 32.8 |
| De-confound-TDE† | 52.4 | 63.5 | 49.2 | 32.2 |
| ICCL (ours, 1st stage, $\gamma = 0$) | 50.5 | 68.5 | 44.4 | 20.8 |
| ICCL (ours, 2nd stage, $\gamma = 0$) | 54.0 | 60.7 | 52.9 | 39.0 |
| ICCL (ours, 1st stage, $\gamma = 0.5$) | 50.6 | 67.8 | 45.5 | 20.3 |
| ICCL (ours, 2nd stage, $\gamma = 0.5$) | 54.1 | 61.1 | 54.0 | 34.6 |

FIG. 6

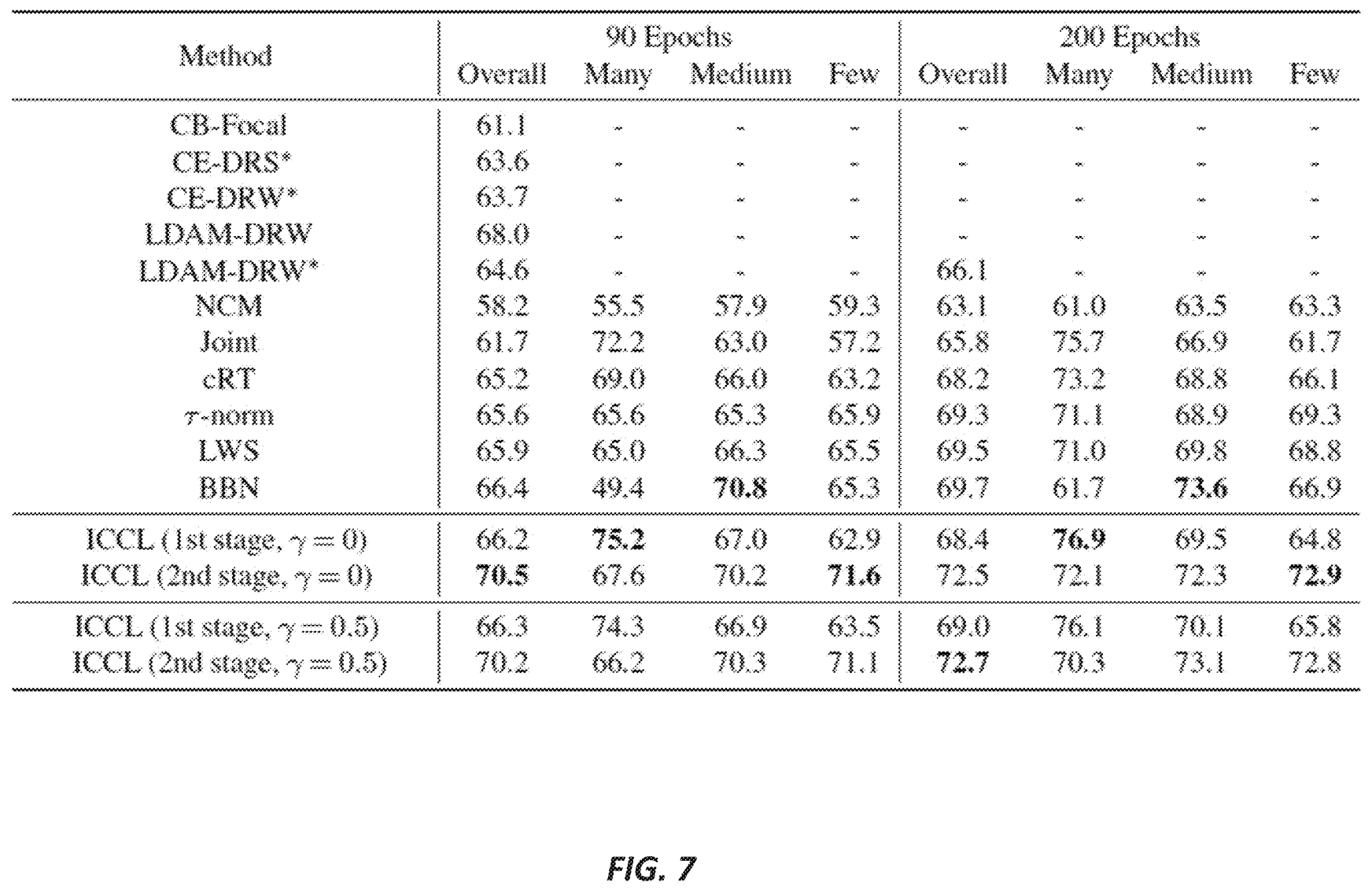

| Method | 90 Epochs | | | | 200 Epochs | | | |
|---|---|---|---|---|---|---|---|---|
| | Overall | Many | Medium | Few | Overall | Many | Medium | Few |
| CB-Focal | 61.1 | - | - | - | - | - | - | - |
| CE-DRS* | 63.6 | - | - | - | - | - | - | - |
| CE-DRW* | 63.7 | - | - | - | - | - | - | - |
| LDAM-DRW | 68.0 | - | - | - | - | - | - | - |
| LDAM-DRW* | 64.6 | - | - | - | 66.1 | - | - | - |
| NCM | 58.2 | 55.5 | 57.9 | 59.3 | 63.1 | 61.0 | 63.5 | 63.3 |
| Joint | 61.7 | 72.2 | 63.0 | 57.2 | 65.8 | 75.7 | 66.9 | 61.7 |
| cRT | 65.2 | 69.0 | 66.0 | 63.2 | 68.2 | 73.2 | 68.8 | 66.1 |
| $\tau$-norm | 65.6 | 65.6 | 65.3 | 65.9 | 69.3 | 71.1 | 68.9 | 69.3 |
| LWS | 65.9 | 65.0 | 66.3 | 65.5 | 69.5 | 71.0 | 69.8 | 68.8 |
| BBN | 66.4 | 49.4 | 70.8 | 65.3 | 69.7 | 61.7 | 73.6 | 66.9 |
| ICCL (1st stage, $\gamma = 0$) | 66.2 | 75.2 | 67.0 | 62.9 | 68.4 | 76.9 | 69.5 | 64.8 |
| ICCL (2nd stage, $\gamma = 0$) | 70.5 | 67.6 | 70.2 | 71.6 | 72.5 | 72.1 | 72.3 | 72.9 |
| ICCL (1st stage, $\gamma = 0.5$) | 66.3 | 74.3 | 66.9 | 63.5 | 69.0 | 76.1 | 70.1 | 65.8 |
| ICCL (2nd stage, $\gamma = 0.5$) | 70.2 | 66.2 | 70.3 | 71.1 | 72.7 | 70.3 | 73.1 | 72.8 |

*FIG. 7*

| $\mathcal{L}_{ce}$ | $\mathcal{L}_{ce}^{it}$ | $\mathcal{L}_{cc}^{it}$ | Warm-up | Overall | Head | Tail |
|:---:|:---:|:---:|:---:|:---:|:---:|:---:|
| ✓ | | | | 51.3 | 60.6 | 45.5 |
| | ✓ | | | 51.6 | 58.3 | 47.4 |
| | ✓ | | ✓ | 51.7 | 57.9 | 47.9 |
| ✓ | | ✓ | ✓ | 52.4 | 59.9 | 47.7 |
| ✓ | ✓ | | ✓ | 53.4 | 61.1 | 48.6 |
| ✓ | ✓ | ✓ | | 53.6 | 61.2 | 48.8 |
| ✓ | ✓ | ✓ | ✓ | 54.0 | 60.7 | 49.8 |

| Beta$(\alpha, \beta)$ | CIFAR100-LT |
|:---:|:---:|
| (0.2, 1.0) | 43.6 |
| (0.2, 0.2) | 43.8 |
| (0.6, 0.6) | 45.4 |
| (1.0, 1.0) | 46.6 |
| (2.0, 2.0) | 46.8 |

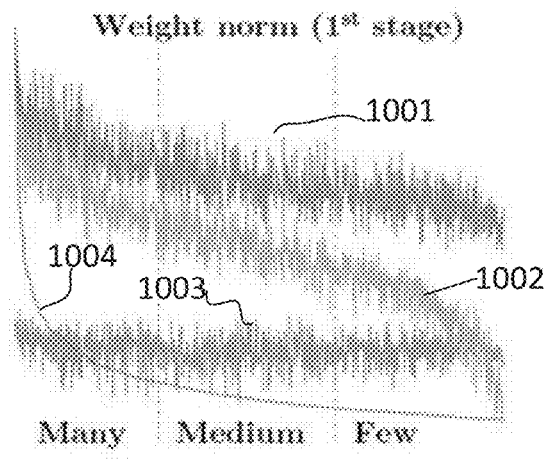
FIG. 10A
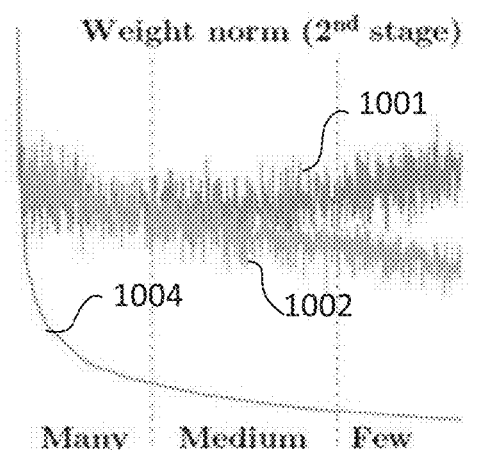
FIG. 10B
| Sampler | CIFAR100-LT | CIFAR10-LT | ImageNet-LT | iNaturalist |
|---|---|---|---|---|
| Uniform | 44.7 | 79.9 | 52.8 | 69.4 |
| $\gamma = 0$ | 46.6 | 82.1 | 54.0 | 70.5 |
| $\gamma = 0.5$ | 46.2 | 81.6 | 54.1 | 70.2 |
| $\gamma = 1.0$ | 46.2 | 81.1 | 53.1 | 70.1 |
FIG. 11
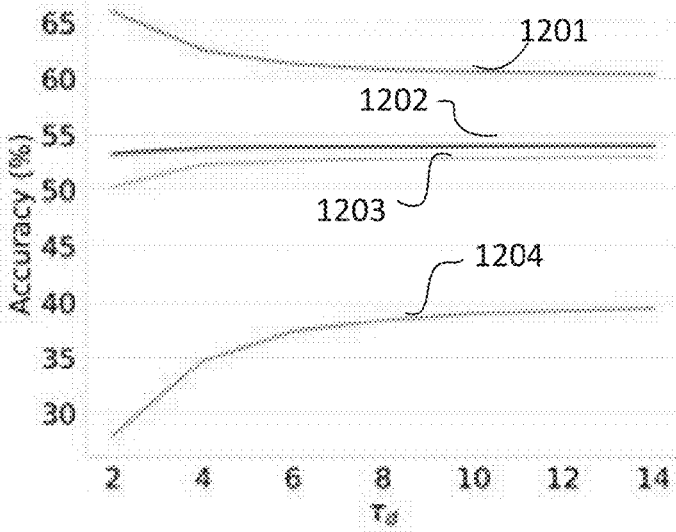
FIG. 12

| $\gamma$ | $\omega_d$ | CIFAR100-LT | CIFAR10-LT | iNaturalist | ImageNet-LT | |
|---|---|---|---|---|---|---|
| | | ICCL | ICCL | ICCL | ICCL | cRT |
| 0 | 0 | 45.3 | 77.5 | 69.5 | 53.7 | 52.4 |
| 0 | 0.5 | 45.0 | 77.6 | 69.5 | 53.2 | 52.2 |
| 1 | 0 | 47.1 | 82.3 | 70.2 | 53.6 | 49.6 |
| 1 | 0.5 | 46.6 | 82.1 | 70.5 | 54.0 | 51.3 |

FIG. 13

SYSTEMS AND METHODS FOR INTERPOLATIVE CENTROID CONTRASTIVE LEARNING

CROSS-REFERENCE(S)

The present disclosure is a nonprovisional of and claims priority under 35 U.S.C. 119 to U.S. Provisional Patent Application No. 63/113,393, filed Nov. 13, 2020, which is hereby expressly incorporated herein by reference in its entirety.

TECHNICAL FIELD

The present disclosure relates generally to machine learning models and neural networks, and more specifically, to interpolative centroid contrastive learning for long-tailed recognition.

BACKGROUND

Large-scale natural datasets, e.g., a dataset of images downloaded from the Internet, etc., may often exhibit an imbalance between the available number of samples of different classes. For example, a dataset of Internet images of animals may contain a greater number of images of common house animals, such as the class of "dogs," than images of rare animals, such as the class of "rhino." The class that enjoys a large number of samples is often referred as the "head" class, and the class that often suffers from fewer samples is referred to as the "tail" class. The long-tailed distribution with large class imbalance between head and tail classes may cause a significant challenge to the recognition of tail class samples. In real-world applications, such natural datasets may be manually curated to generate datasets where object classes have a balanced number of samples such that a neural model may learn the representations from the tail classes more accurately. But such human curation can be resource-intensive and costly.

BRIEF DESCRIPTION OF THE DRAWINGS

FIG. 4 is a simplified flowchart of a method operating the ICCL framework shown in FIG. 1 at training and inference, according to some embodiments of the present disclosure.

FIGS. 5-13 show performance data charts illustrating example performance results of ICCL framework, according to embodiments described herein.

Figure 1A:
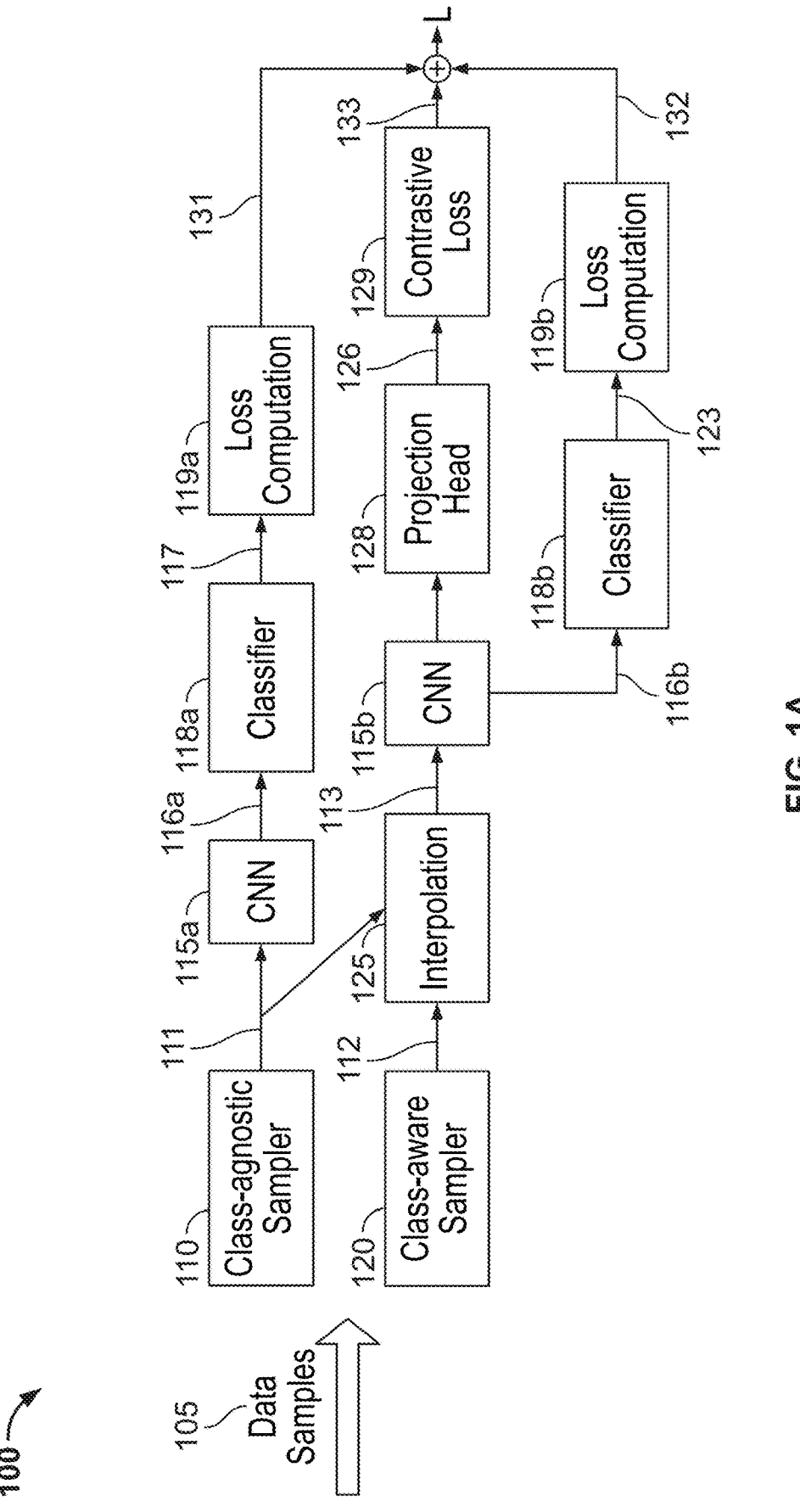
FIG. 1A is a simplified block diagram illustrating an example architecture of the interpolative centroid contrastive learning (ICCL) framework, according to one embodiment described herein.

In the figures and appendix, elements having the same designations have the same or similar functions.

DETAILED DESCRIPTION

Long-tailed distribution refers to the general phenomenon where a small number of items of a given category (e.g., words, images, objects, classes, etc.) occur frequently in a given natural dataset, and thus are amenable for modeling, while a large number of other items of the same category occur rarely, presenting a challenge to accurately learning the representations of all classes. For example, a natural dataset of animal species may include some species that appear very frequently in the dataset, corresponding to the head class of the species distribution, while most species are represented in the dataset by only very few specimens, corresponding to the tail class of the distribution. The imbalance between the head class and the tail class, as well as the relative scarcity of items in the tail class can pose challenges to using such datasets as training datasets to learn an accurate representation for the tail classes, for example to develop algorithms for image recognition and computer vision tasks.

Although the imbalance between the head and tail classes as well as the scarcity of tail-class samples in long-tailed datasets can be at ameliorated by manually curating the samples in the tail-class, such efforts may not be satisfactory as they are resource-intensive. Other approaches include data re-sampling to address the imbalance by skewing training dataset distribution towards the tail (e.g., through under-sampling or over-sampling), re-weighing techniques to modify loss functions used in training a neural model to increase gradient contribution or decision margin of tail classes, etc. Such methods, however, may still result in unsatisfactory learning of accurate representation for tail classes.

In view of the need for accurate long-tailed representation learning, some embodiments of the present disclosure disclose an interpolative centroid contrastive learning (ICCL) framework for learning a more discriminative representation for tail classes, e.g., from a long-tailed natural dataset but without human efforts to curate the natural data. Specifically, data samples, such as natural images, are projected into a low-dimensional embedding space, and class centroids for respective classes are created as average embeddings of samples that belong to a respective class. Virtual training samples are then created by interpolating two images from two samplers: a class-agnostic sampler which returns all images from both the head class and the tail class with an equal probability, and a class-aware sampler which focuses more on tail-class images by sampling images from the tail class with a higher probability compared to images from the head class. The sampled images, e.g., images from the class-agnostic sampler and images from the class-aware sampler may be interpolated to generate interpolated images.

The interpolated images are then used, along with the class centroids, to train a neural model that results in improved representation for the tail-class (e.g., without distorting head-class representation). Specifically, given the embedding of the interpolated images, the class centroids are queried with a contrastive similarity matching. The neural model is trained in a way such that the embedding has higher similarities with the correct class centroids. Different from the conventional parametric classifier which suffers from imbalance of the weights, the contrastive learning framework described herein adopts a centroid-based non-parametric classifier which is intrinsically balanced. In this way, intra-class variance is reduced and inter-class variance is increased by optimizing the distance between sample embeddings and the class centroids. Representation of different classes can be improved by addressing class imbalance with class-aware sample interpolation.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

FIG. 1A is a simplified block diagram illustrating an example architecture of the ICCL framework, according to one embodiment described herein. The ICCL framework 100 includes two branches: a uniform branch comprising a class-agnostic sampler 110, a convolutional neural network (CNN) 115a, a classifier 118a, and a loss computation module 119a, and an interpolative branch of a class-aware sampler 120, an interpolation module 125, a CNN 115b, a projection head 128, a classifier 118b, a contrastive loss module 129 and a loss computation module 119b. The uniform branch may be directed to modeling head-class image samples and the interpolative branch directed to modeling tail-class samples while preserving head-class representations.

In some embodiments, the uniform branch and the interpolative branch share the same model parameters for some modules, e.g., CNN 115a and CNN 115b may share the same parameters, classifier 118a and classifier 118b may share the same parameters.

In some embodiments, in the uniform branch, a training dataset 105 of image samples with long-tailed distribution of images can be used by the ICCL framework 100 to learn representations from the head-class image samples of the training dataset, which can be data-rich (i.e., a large number of the samples of the training dataset may belong to the head-class of the dataset). Specifically, a dataset of image samples 105, which include both head class image samples and tail class image samples, denoted by $\mathcal{D}=\{(x_i, y_i)\}_{i=1}^{n}$, where $x_i$ is an image and $y_i \in \{1, 2, \ldots, K\}$ is the corresponding class label, may be received at the two samplers 110 and 120. The training dataset 105 can be decomposed into $\mathcal{D}=\mathcal{D}^h \cup \mathcal{D}^t$, where $\mathcal{D}^h=\{(x_i, y_i)\}_{i=1}^{n^h}$ comprises head class samples and $\mathcal{D}^t=\{(x_i, y_i)\}_{i=1}^{n^t}$ comprises tail-class samples. As $n^h \gg n^t$, framework 100 may need to learn strong discriminative representations for tail classes in a low-resource and imbalanced setting, such that it is not overwhelmed by the abundant head-class samples and is able to classify both head and tail classes correctly.

In the uniform branch, the class-agnostic sampler 110 is configured to select all samples from the training dataset of image samples (including both head class samples and tail class samples) with an equal probability regardless of the class. Thus, the class-agnostic sampler 110 may generate a sample 111 which may be more likely to be a head-class sample. The sample 111 returned by the class-agnostic sampler 110 is denoted as $(x_i^h, y_i^h)$.

The sample 111 from the class-agnostic sampler 110 is then sent to a CNN encoder 115a, which transforms the image sample 111 into a feature vector $g_i \in \mathbb{R}^{d_g}$ (116a). For example, the CNN encoder 115a may be the ResNet model described in He et al., Deep residual learning for image recognition, in Proceedings of the IEEE conference on Computer Vision and Pattern Recognition (CVPR), pages 770-778, 2016, and/or the variants described in Xie et al., Aggregated residual transformations for deep neural networks, in Proceedings of the IEEE conference on CVPR, pages 1492-1500, 2017, both of which are hereby expressly incorporated by reference herein in their entirety. The feature vector 116a may be the output from the global average pooling layer of the CNN encoder 115a.

The feature vector 116a is then sent to a linear classifier 117 with softmax activation which returns a class probability distribution $p(x_i^h)$ (117) given the feature vector $g_i$. The class probability 117 is then sent to a loss computation module 119a to compute a classification loss of the uniform branch. Specifically, given the classifier's output prediction probability distribution $p(x_i^h)$ for an image $x_i^h$, the classification loss 131 on the uniform branch is computed as the cross-entropy loss:

$$\mathcal{L}_{ce}=-\log(p^{y_i^h}(x_i^h))$$

In the interpolative branch, the class-aware sampler 120 is configured to emphasize on tail classes. Specifically, the class-aware sampler 120 first samples a class and then selects the corresponding samples uniformly with repetition. For example, if $n^k$ denotes the number of samples in class k, the probability $p(k)$ of sampling samples belonging to class k is inversely proportional to $n^k$ as follows:

$$p(k) = \frac{(n^k)^{-\gamma}}{\sum_{j=1}^{K} (n^j)^{-\gamma}}$$

where $\gamma$ is an adjustment parameter. Thus, in this way, the sample 112 returned by the class-aware sampler 120, denoted by $(x_i^t, y_i^t)$, has a much higher probability to be a tail class sample than to be a head class sample.

The interpolation module 125 then generates an interpolative image $x_i^f$ 113 by linearly combining the two image samples 111 and 112 from the class-agnostic sampler 110 and the class-aware sampler 120, respectively, e.g., $$x_i^f=\lambda x_i^h+(1-\lambda)x_i^t$$

where $\lambda \sim \mathcal{U}(0,1)$ is sampled from a uniform distribution. The contrastive learning trains the model such that the representation of the interpolative image 113 is discriminative for both class $y_i^h$ and $y_i^t$.

The interpolative image 113 is then sent to CNN encoder 115b, which shares the same parameters as CNN encoder 115a. Thus, similarly, CNN encoder 115b may encode the image sample 113 into a feature vector 116b, which is then passed to the classifier 118b. The classifier 118b shares the same parameters with classifier 118a, and in turn generate a prediction probability distribution 123. The loss computation module 119b may then compute a classification loss for the interpolative branch as a cross entropy loss 132 of the prediction probability distribution 123, e.g., $$\mathcal{L}_{ce}^{it}=-\lambda \log(p_i^{y_i^h}(x_i^f))-(1-\lambda)\log(p_i^{y_i^t}(x_i^f))$$

Meanwhile, the feature vector 121 encoded from the interpolative image sample $x_i^f$ 113 is also sent to a projection head 128. The projection head 128 transforms the feature vector 121 into a low-dimensional normalized embedding $z_i \in \mathbb{R}^{d_z}$ 126. For example, the projection head may be a multiple layer perceptron (MLP) with one hidden layer of size $d_g$ and ReLU activations. Further examples of the projection head can be found in SimCLR described in Chen et al., A simple framework for contrastive learning of visual representations, in proceedings of the International Conference on Machine Learning, 2020, which is hereby expressly incorporated by reference herein in its entirety.

On the other hand, class centroids $c^k \in \mathbb{R}^{d_z \times K}$ are computed in the low-dimensional embedding space. Specifically, the centroid of each class is computed as the exponential-moving-average (EMA) of the low-dimensional embeddings for samples from that class. For example, the centroid for class k is updated during training by:

$$c^k \leftarrow m \cdot c^k + (1-m) \sum_{k=1}^{K} \mathbb{1}_{y_{i=k}} \cdot z_i$$

where m is the momentum coefficient and is set, for one example, as 0.99.

The normalized embeddings 126 (together with the class centroids) are then sent to a contrastive loss module 129. Given the low-dimensional embedding $z_i^f$ for an interpolative sample $x_i^f$, the embedding $z_i^f$ is used to query the class centroids with contrastive similarity matching. Specifically, the probability that k-th class centroid $c^k$ is retrieved is given as:

$$p(c^k \mid x_i^f) = \frac{\exp(z_i^f \cdot c^k / \tau)}{\sum_{j=1}^{K} \exp(z_i^f \cdot c^j / \tau)}$$

where $\tau$ is a scalar temperature parameter to scale the similarity. Thus, the probability for the class centroid can be interpreted as a non-parametric classifier. Since the centroid is computed as the moving-average of $z_i^f$, it does not suffer from the problem of weight imbalance as a parametric classifier does.

The interpolative sample $x_i^f$ 113 is a linear interpolation of $x_i^h$ 111 and $x_i^t$ 112. Then the contrastive loss module 129 may compute a contrastive loss 133 that encourages the retrieval of the corresponding centroids of class $y_i^h$ and $y_i^t$. The interpolative centroid contrastive loss 133 is computed as:

$$\mathcal{L}_{cc}^{it} = -\lambda \log(p(c^{y_i^h} \mid x_i^f)) - (1-\lambda)\log(p(c^{y_i^t} \mid x_i^f))$$

The ICCL loss 133 introduces valuable structural information into the embedding space such that the correct class centroids have higher similarities with the embedding of the interpolated image can be retrieved. The numerator of $p(c \mid x_i^f)$ reduces the intra-class variance by pulling embeddings with the same class closer to the class centroid. The denominator of $p(c \mid x_i^f)$ increases the inter-class variance by pushing an embedding away from other classes' centroids. Therefore, more discriminative representations of tail class samples can be learned.

During training, the classification loss 131, the classification loss 132 and the ICCL loss 133 are combined to generate a total loss objective, which can be jointly minimized:

$$\mathcal{L}_{total} = \sum_{i=1}^{n} \omega_u \mathcal{L}_{ce} + \omega_{it}(\mathcal{L}_{ce}^{it} + \mathcal{L}_{cc}^{it})$$

where $\omega_u$ and $\omega_{it}$ are the weights for the uniform branch and the interpolative branch, respectively. The computed loss objective may be used to jointly update the framework 100.

Specifically, the framework 100 can be viewed as one CNN, one classifier, one projection head with two forward propagations of different examples, e.g., one forward propagation of CNN and the classifier for the class-agnostic sample, and the other forward propagation path of CNN, the classifier and the projection head for the interpolated sample. The classification loss 131 can be used to update parameters of CNN 115a and classifier 118a, while classification loss 132 may be used to update parameters of CNN 115b and classifier 118b. The backpropagation of contrastive loss 133 may be used to update the projection head 128 and CNN 115b. The CNNs 115a and 115b share the same parameters, and classifiers 118a and 118b share the same parameters. Thus, the CNN parameters and the classifier parameters are updated based on the sum of the classification loss 131, the classification loss 132 and the ICCL loss 133. The projection head parameters are updated by the ICCL loss 133 only.

Figure 1B:
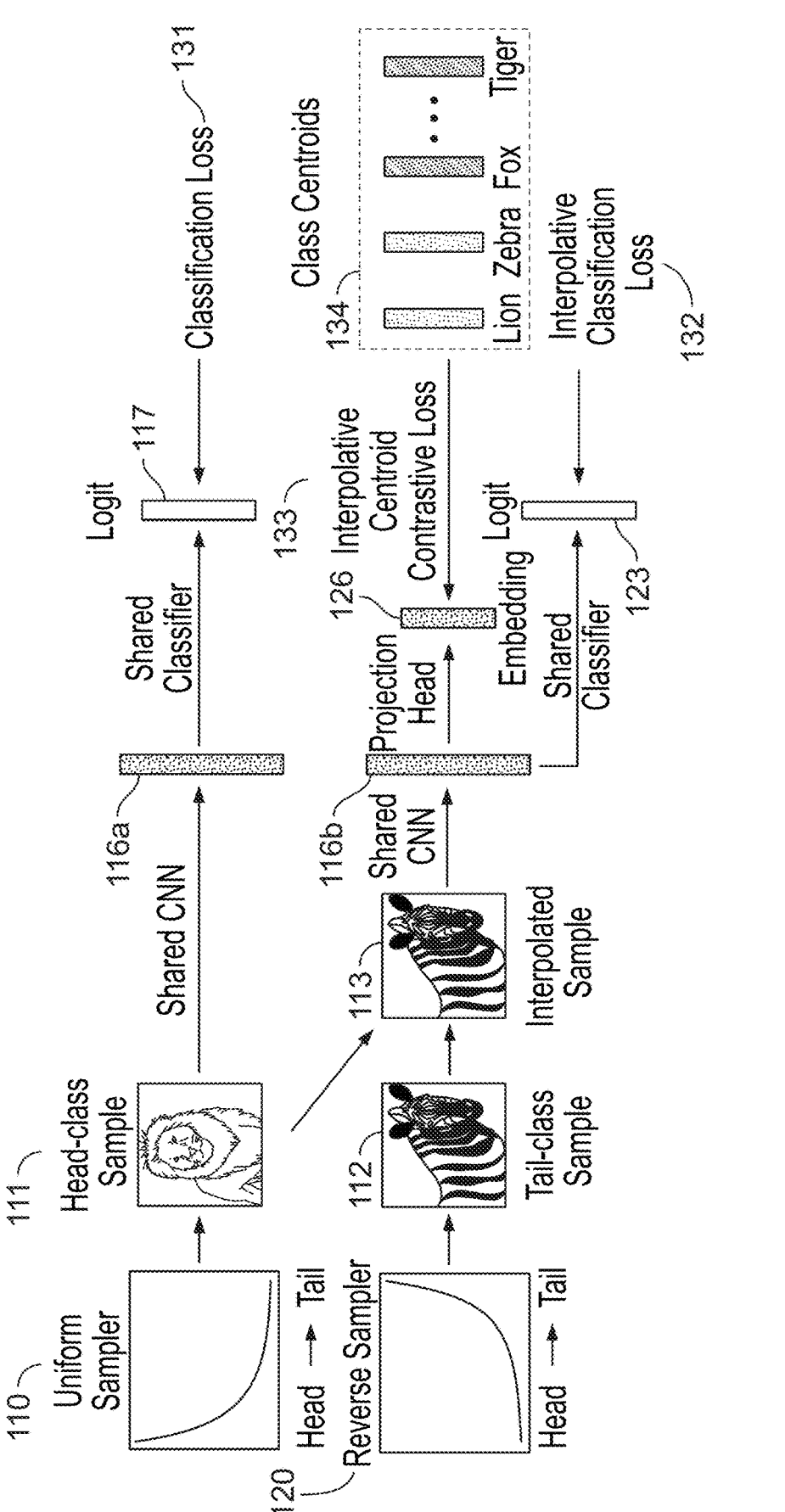
FIG. 1B is a simplified block diagram illustrating an example data flow diagram illustrating example data samples generated by and/or exchanged between the modules shown in FIG. 1A, according to one embodiment described herein.

FIG. 1B is a simplified block diagram illustrating an example data flow diagram illustrating example data samples generated by and/or exchanged between the modules shown in FIG. 1A, according to one embodiment described herein. The uniform sampler 110 may correspond to the class-agnostic sampler 110 in FIG. 1A. The probability curve among classes shows that the probability that a head class sample is selected is much higher than the probability that a tail class sample is selected. Similarly, the reverse sampler 120 may correspond to the class-aware sampler 120 in FIG. 1A. The probability curve among classes shows that the probability that a head class sample is selected is much lower than the probability that a tail class sample is selected. For example, a head class image of a lion 111 may be selected by the uniform sampler, while a tail class image of a zebra 112 may be selected by the reverse sampler. The image of lion 111 and the image of zebra 112 may be linearly combined to form the interpolative image 113.

The head class image of lion 111 may be passed through the uniform branch to generate a classification loss 131, as described in FIG. 1A. The interpolated image of lion and zebra 113 may, on one hand, be used to compute an interpolative classification loss 132, as described in FIG. 1A. On the other hand, the interpolated image of lion and zebra 113 may be used to compute an ICCL loss 133. For example, in the low-dimensional space 134, class centroids of different classes, e.g., lion, zebra, fox, tiger, . . . , etc., are computed. Given the low-dimensional embedding 126 of the interpolated image 113, the class centroids of lion and zebra may be queried with contrastive similarity matching. By minimizing the ICCL loss 133, the distance between the low-dimensional embedding 125 and the positive class centroids of lion and zebra is reduced, while the distance(s) between the low-dimensional embedding 125 and other negative class centroids (fox, tiger, etc.) are enlarged.

Figure 2:
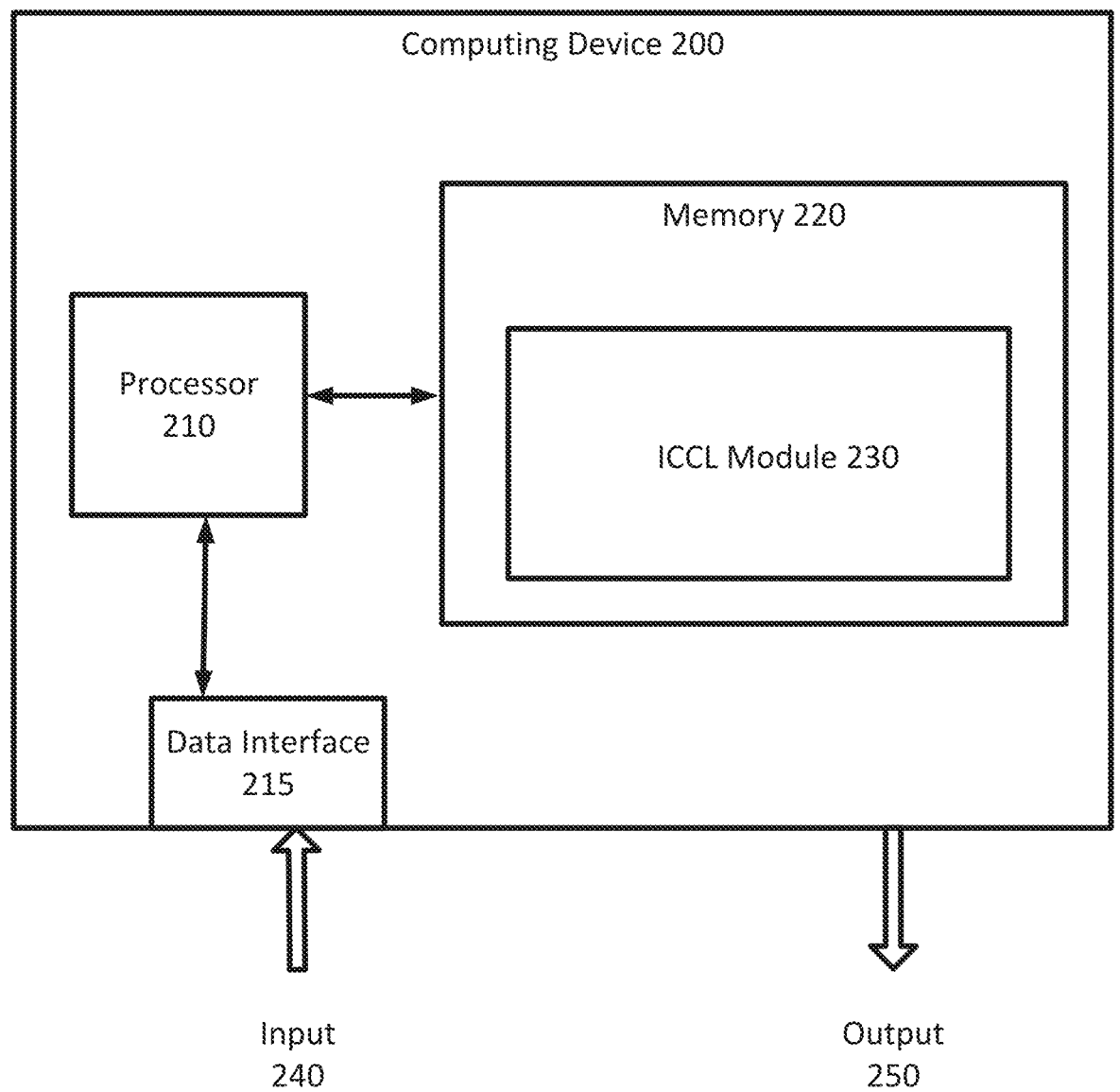
FIG. 2 is a simplified diagram of a computing device that implements the ICCL framework shown in FIG. 1A, according to some embodiments.

FIG. 2 is a simplified diagram of a computing device 200 that implements the ICCL framework shown in FIG. 1A, according to some embodiments. As shown in FIG. 2, computing device 200 includes a processor 210 coupled to memory 220. Operation of computing device 200 is controlled by processor 210. And although computing device 200 is shown with only one processor 210, it is understood that processor 210 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 200. Computing device 200 may be implemented as a stand-alone subsystem, as a board added to a computing device, and/or as a virtual machine.

Memory 220 may be used to store software executed by computing device 200 and/or one or more data structures used during operation of computing device 200. Memory 220 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 210 and/or memory 220 may be arranged in any suitable physical arrangement. In some embodiments, processor 210 and/or memory 220 may be implemented on a same board, in a same package (e.g., system-in-package), on a same chip (e.g., system-on-chip), and/or the like. In some embodiments, processor 210 and/or memory 220 may include distributed, virtualized, and/or containerized computing resources. Consistent with such embodiments, processor 210 and/or memory 220 may be located in one or more data centers and/or cloud computing facilities.

As shown, memory 220 includes an interpolative centroid contrastive learning (ICCL) module 230 that may be used to implement and/or emulate the neural network systems and models described further herein and/or to implement any of the methods described further herein, such as but not limited to the method described with reference to FIG. 2. ICCL module 230 may be used, in some examples, to improve long-tailed representation learning of images by interpolating images from head and tail classes and training a neural model such that the representation of the interpolated image can be used to retrieve the class centroids for both the head class and the tail class. For example, the ICCL module 230 may include modules shown in the framework 100 in FIG. 1A.

In some examples, memory 220 may include non-transitory, tangible, machine readable media that includes executable code that when run by one or more processors (e.g., processor 210) may cause the one or more processors to perform the methods described in further detail herein. In some examples, ICCL module 230 may be implemented using hardware, software, and/or a combination of hardware and software. As shown, computing device 200 receives, via the data interface 215, an input 240, e.g., an image sample, which is provided to the ICCL module 230, which then may generate output 250 such as a classification label for the image sample.

In some embodiments, the input 240 may include images from training datasets exhibiting large class imbalance, i.e., the training datasets may include a head class that includes a significant number of the images and a tail class that includes scare number of images, in particular in comparison to the head class. In some embodiments, the output 250 can include interpolated images obtained by interpolating images from the head class and the tail class of the training datasets, i.e., training datasets configured to train a neural model to better represent long-tailed datasets.

Figure 3:
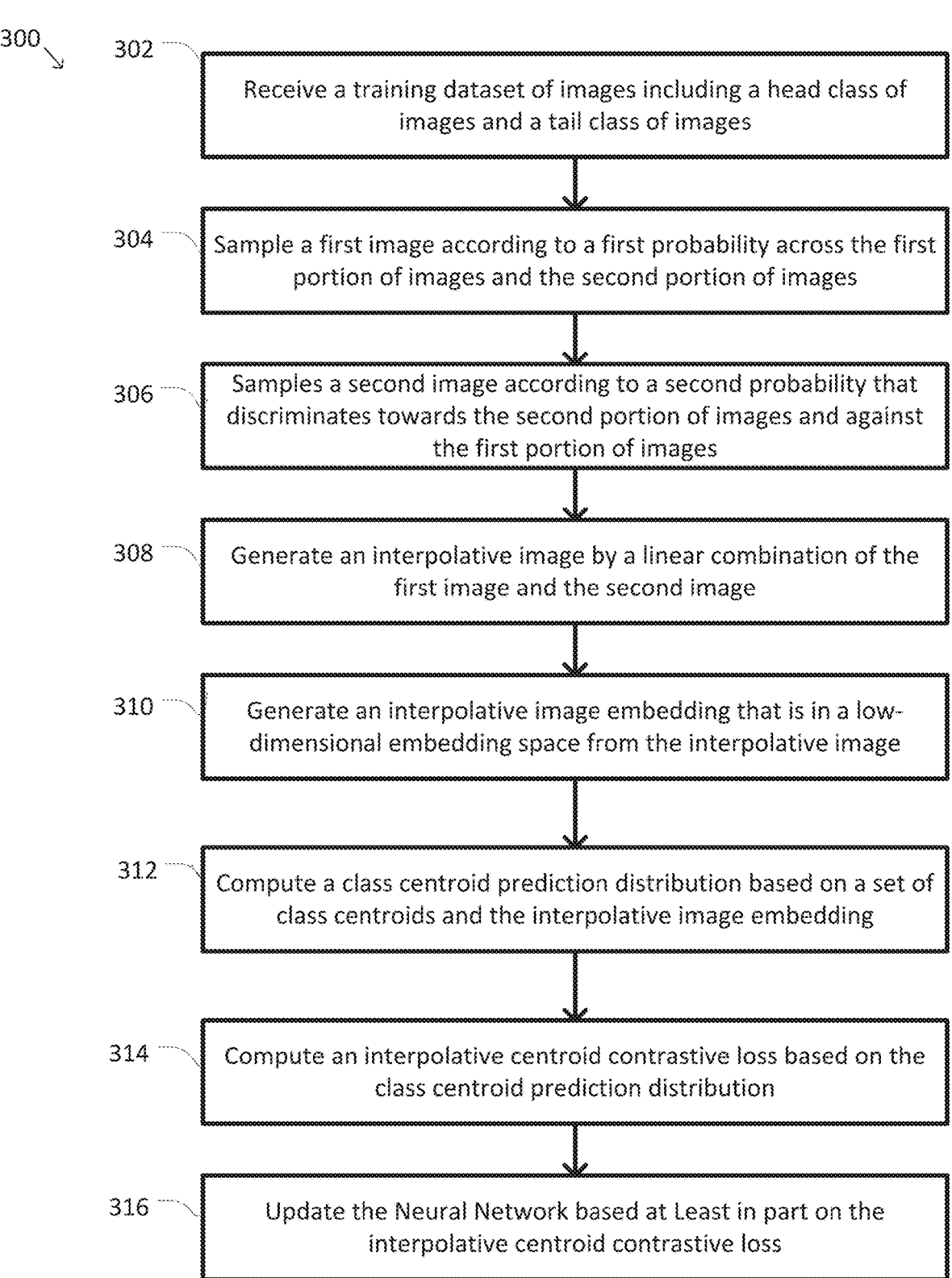
FIG. 3 is a simplified flowchart of a method for long-tailed recognition using interpolative centroid contrastive learning, according to some embodiments of the present disclosure.

FIG. 3 is a simplified flowchart of a method for long-tailed recognition using interpolative centroid contrastive learning, according to some embodiments of the present disclosure. One or more of the processes of method 300 may be implemented, at least in part, in the form of executable code stored on non-transitory, tangible, machine-readable media that when run by one or more processors may cause the one or more processors to perform one or more of the processes. In some embodiments, method 300 corresponds to the operation of ICCL module 230 (FIG. 2) to perform interpolative centroid contrastive learning for long-tailed recognition. As illustrated, the method 300 includes a number of enumerated steps, but embodiments of the method 300 may include additional steps before, after, and in between the enumerated steps. In some embodiments, one or more of the enumerated steps may be omitted or performed in a different order.

At step 302, a training dataset of images is received including a first portion of images belonging to a first class and a second portion of images belonging to a second class, e.g., via data interface 215 in FIG. 2. For example, the training dataset of images may include a head class having a large number of images, and a tail class having a relatively smaller number of images.

At step 304, a class-agnostic sampler (e.g., 110) samples a first image according to a first probability across the first portion of images and the second portion of images. For example, as shown in FIG. 1B, while the uniform sampler 110 samples head class images and tail class images with equal probability, the head class image is most likely to be selected.

At step 306, a class-aware sampler (e.g., 120) samples a second image according to a second probability that discriminates towards the second portion of images and against the first portion of images. For example, as shown in FIG. 1B, the reverse sampler 120 is more likely to sample a tail class image with a sampling probability that is reversely proportional to the number of samples of the class.

At step 308, an interpolative image (e.g., 113) is generated by a linear combination of the first image and the second image.

At step 310, a projection head at the neural network generates an interpolative image embedding that is in a low-dimensional embedding space from the interpolative image.

At step 312, a class centroid prediction distribution is computed based on a set of class centroids and the interpolative image embedding.

At step 314, an interpolative centroid contrastive loss may be computed based on the class centroid prediction distribution.

At step 316, the neural network may be updated based at least in part on the interpolative centroid contrastive loss. For example, as described in relation to FIG. 1A, the neural network may be jointly updated by a sum of the two classification losses and the interpolative centroid contrastive loss.

FIG. 4 is a simplified flowchart of a method operating the ICCL framework shown in FIG. 1 at training and inference, according to some embodiments of the present disclosure. One or more of the processes of method 400 may be implemented, at least in part, in the form of executable code stored on non-transitory, tangible, machine-readable media that when run by one or more processors may cause the one or more processors to perform one or more of the processes. In some embodiments, method 400 corresponds to the operation of ICCL module 230 (FIG. 2) to perform interpolative centroid contrastive learning for long-tailed recognition. As illustrated, the method 400 includes a number of enumerated steps, but embodiments of the method 400 may include additional steps before, after, and in between the enumerated steps. In some embodiments, one or more of the enumerated steps may be omitted or performed in a different order.

Process 400 shows that a training curriculum with a warm-up strategy may be adopted. Specifically, at step 410, for the first T training epochs, only the uniform branch is used for training, by minimizing the cross-entropy loss 131 and a (non-interpolative) centroid contrastive loss $\mathcal{L}_{cc}=-\log(p(c^{y_i^h}|x_i^h))$ to update the parameters of CNN 115a and classifier 118a via backpropagation. The updated parameters of CNN 115a and classifier 118a are shared with CNN 115b and classifier 118b.

At step 420, after the T epochs, the interpolative branch is included to jointly train the network based or $\mathcal{L}_{total}$. For example, the CNN parameters and the classifier parameters are updated based on the sum of the classification loss 131, the classification loss 132 and the ICCL loss 133. The projection head parameters are updated by the ICCL loss 133 only.

The warm-up provides a good initialization of the representations and the centroids, which is crucial for long-tailed representation learning. The T epochs is scheduled to be approximately halfway through the total number of epochs.

At step 430, classifiers 115a-b may be rebalanced after the representation learning stage. Specifically, the projection head 128 may be removed from the framework 100 such that the linear classifiers 118a-b can be fine-tuned with the standard cross-entropy loss 131 and/or 132. The CNN encoder 115a-b is either fixed or fine-tuned with a smaller learning rate. In order to rebalance the classifier towards tail classes, class-aware sampler 120 is employed. The sampler's adjustment parameter is denoted as $\gamma'$ which is set as $\gamma'=1$.

At step 440, the classifiers may be updated based on a combination of cross entropy loss and a distillation loss. Specifically, due to more frequent sampling of tail-class samples by the class-aware sampler, the classifier's logits distribution may shift towards the tail classes at the cost of lower accuracy on head classes. In order to maintain the head-class accuracy, a distillation loss is used using the classifier trained from the first stage as the teacher. The over-all loss for classifier balancing consists of a cross-entropy classification loss and a KL-divergence distillation loss:

$$\mathcal{L}_{cb}=\Sigma_{i=1}^n(1-\omega_d)\mathcal{L}_{ce}+\omega_d\tau_d^2\mathcal{L}_{KL}(\sigma(o^T/\tau_d),\tau(o^S/\tau_d))$$

where $\omega_d$ is the weight of the distillation loss, $o^S$ and $o^T$ are the class logits produced by the student (2nd stage) and the teacher (1st stage) classifier, respectively. $\tau_d$ is the distillation temperature and $\sigma$ is the softmax function. In one example, $\omega_d=0.5$ and $\tau_d=10$ for all experiments.

At step 450, during inference, a standard classification model that consists of the CNN encoder 115a (or 115b) followed by the classifier 118a (or 119b) and the projection head 128 are connected into the neural model.

Example Performance

Example training datasets for the proposed ICCL method may include:

CIFAR-LT. CIFAR10-LT and CIFAR100-LT contain samples from the CIFAR10 and CIFAR100 dataset, respectively. The class sampling frequency follows an exponential distribution. The LT datasets may be constructed with different imbalance ratios of 100, 50, and 10. Imbalance ratio is defined as the ratio of maximum to the minimum class sampling frequency. The number of training images for CIFAR10-LT with an imbalance ratio of 100, 50 and 10 is 12 k, 14 k and 20 k, respectively. Similarly, CIFAR100-LT has a training set size of 11 k, 13 k and 20 k. Both test sets are balanced with the original size of 10 k.

ImageNet-LT—The training set consists of 1000 classes with 116 k images sampled from the ImageNet dataset. The class sampling frequency follows a Pareto distribution with a shape parameter of 6. The imbalance ratio is 256. Despite a smaller training size, it retains ImageNet original test set size of 50 k.

iNaturalist 2018—a real-world long-tailed dataset for fine-grained image classification of 8, 142 species. The official training and test datasets composing of 438 k training and 24 k test images may be used.

For all datasets, the ICCL models are evaluated on the test sets and report the overall top-1 accuracy across all classes. To further access the model's accuracy on different classes, the classes are grouped into splits according to their number of images: many (>100 images), medium (20-100 images) and few (<20 images).

For fair comparison, for example, for the hyper-parameters, temperature r=0.07, uniform branch weight $\omega_u=1$, and interpolative branch weight $\omega_{it}=1$ in the representation learning stage. For $\gamma$ in class-aware sampler, we report results for both $\gamma=0$ and $\gamma=0.5$. The MLP projection head outputs embedding size $d_z=128$. The optimizer is SGD with a momentum of 0.9. In the classifier balancing stage, the CNN is frozen and the classifier is fine-tuned using the original learning rate×0.1 with cosine scheduling for 10 epochs.

On CIFAR-LT, the ResNet-32 is used as the CNN encoder. The model is trained for 200 epochs with a batch size of 128. The projected embedding size is $d_z=32$. Standard data augmentation is used, which consists of random horizontal flip and cropping with a padding size of 4. The learning rate warms up to 0.1 within the first 5 epochs and decays at epoch 120 and 160 with a step size of 0.01. A weight decay of 2e-4 is used. $\tau=0.3$ and T as 80 and 100 epochs for CIFAR100-LT and CIFAR10-LT, respectively. $\omega_u$ is set as 0 after warm-up. In the classifier balancing stage, the CNN encoder is fine-tuned using cosine scheduling with an initial learning rate of 0.01.

On ImageNet-LT, ResNeXt-50 model is trained for 90 epochs using a batch size of 256, a weight decay of 5e-4, and a base learning rate of 0.1 with cosine scheduling. The data is augmented using random horizontal flip, cropping and colour jittering. T=40.

On iNaturalist 2018, a ResNet-50 model is trained for 90 epochs and 200 epochs using 0.2 learning rate with cosine decay, 512 batch size and 1e-4 weight decay. The data augmentation comprises of only horizontal flip and cropping. T is set as 40 and 100 epochs for training epochs of 90 and 200, respectively.

FIG. 5 demonstrates that ICCL surpasses existing methods across different imbalance ratios for both CIFAR100-LT and CIFAR10-LT. Specifically, performance of baseline models labeled with "*" are obtained from Zhou et al., BBN: Bilateral-branch network with cumulative learning for long-tailed visual recognition, in proceedings of Computer Vision and Pattern Recognition, pages 1-8, 2020, and performance of baseline models labeled with "†" are reproduced based on Kang et al., Decoupling representation and classifier for long-tailed recognition, in proceedings of International Conference on Learning Representation, 2020. The aforementioned references are hereby expressly incorporated herein by reference in their entirety.

Notably, after the representation learning stage, our approach generally achieves competitive performance compared to existing methods apart from Deconfound-TDE, described in Tang et al., Long-tailed classification by keeping the good and removing the bad momentum causal effect, in *NeurIPS*, 2020, which is hereby expressly incorporated herein by reference in its entirety. By balancing the classifier, the performance of ICCL further improves and outperforms De-confound-TDE by 2.5% on the more challenging CIFAR100-LT with imbalance ratio of 100.

ImageNet-LT. FIG. 6 presents the ImageNet-LT results, where ICCL outperforms the existing state-of-the-arts. Specifically, performance of baseline models labeled with "*" are obtained from Tang et al., while performance of baseline models labeled with "†" are obtained using ICCL of improved hyperparameters. An improved set of hyper-parameters which increases the accuracy for existing methods. Specifically, a smaller batch size of 256 and a learning rate of 0.1. Furthermore, an original learning rate×0.1 for classifier balancing is used. As shown ICCL achieves the best overall accuracy of 54.1% with noticeable accuracy gains on medium and few classes.

iNaturalist 2018. On the real-world large-scale iNaturalist 2018 dataset, ICCL achieves substantial improvements compared with existing methods as shown in FIG. 7. For 90 and 200 epochs, ICCL surpasses BBN by 4.1% and 3.0% respectively. The split accuracy of BBN based on the checkpoint released by the authors. It is observed that BBN suffers from a large discrepancy of 21.4% between the many and medium class accuracy for 90 epochs, whereas ICCL has more consistent accuracy across all splits. Additionally, ICCL obtains a best overall accuracy of 70.5% at 90 epochs which is better than BBN (69.7%) at 180 epochs.

Extensive ablation study is conducted to examine the effect of each component and hyper-parameter of ICCL and provide analysis on what makes ICCL successful.

Figures 8, 9:
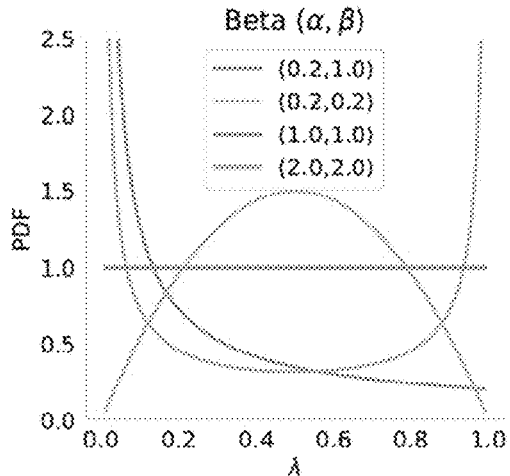

Loss components. For representation learning, ICCL introduces the interpolative centroid contrastive loss $\mathcal{L}_{cc}^{it}$ and the interpolative cross-entropy loss $\mathcal{L}_{ce}^{it}$. In FIG. 8, the contribution of each loss components is evaluated using ImageNet-LT dataset. Many split is considered as the head classes (>100 images per class), medium and few splits as the tail classes (≤100 images per class). It is observed that both $\mathcal{L}_{cc}^{it}$ and $\mathcal{L}_{ce}^{it}$ improve the overall accuracy individually and collectively. By comparing with $\mathcal{L}_{ce}^{it}$ the ICCL loss formulation achieves superior performance. Additionally, having a warm-up before incorporating interpolative losses pro-vides an extra accuracy boost, especially for the tail classes.

Interpolation weight $\lambda$. The interpolation weight $\lambda \in [0, 1]$ from a uniform distribution, which is equivalent to Beta(1, 1). The beta distribution is varied and its effect is studied on CIFAR100-LT with an imbalance ratio of 100. The resulting accuracy and the corresponding beta distribution are shown in FIG. 9. Sampling from Beta(0.2, 1.0) is more likely to return a small $\lambda$, thus the interpolative samples contain more information about images from the class-aware sampler. If $\alpha=\beta$ and is increased from 0.2 to 2, the accuracy increases. Good performance can be achieved with Beta(1.0, 1.0) and Beta(2.0, 2.0), where the sampled $\lambda$ is less likely to be an extreme value.

Class-aware sampler adjustment parameter $\gamma$ is investigated on representation learning. A a class-agnostic uniform sampler is included as the baseline. FIG. 11 shows that the interpolative branch sampler should neither focus excessively on the tail classes ($\gamma=1$) nor on the head classes (uniform). When using either of these two samplers, the resulting interpolative image might be less informative due to excessive repetition of tail-class samples or redundant head-class samples.

Classifier balancing parameters. In the classifier balancing stage, the sampler adjustment parameter is fixed $\gamma'=1$, and the distillation weight $\omega_d=0.5$. Their effects is studied in FIG. 13. For ICCL approach, using a reverse sampler ($\gamma'=1$) is better than a balanced sampler ($\gamma'=0$). Furthermore, the distillation loss tends to benefit more complex ImageNet-LT and iNaturalist than CIFAR-LT datasets.

Weight norm visualisation. The L2 norms of the weights for the linear classification layer suggest how balanced the classifier is. Having a high weight norm for a particular class indicates that the classifier is more likely to generate a high logit score for that class. FIGS. 10A-10B depict the weight norm of ICCL (1001) and cRT (1002) after the representation learning and classifier balancing stage. In both stages, the ICCL classifier has a more balanced weight norm compared with cRT. Furthermore, the norm of class centroids $c^k$ (1004) shows that the centroids are intrinsically balanced across different classes of data 1004.

Distillation temperature $\tau_d$. In FIG. 12, it is studies how $\tau_d$ affects the accuracy of ICCL on ImageNet-LT. The overall accuracy is not sensitive to changes in $\tau_d$. As $\tau_d$ increases, the teacher's logit distribution becomes more flattened. Therefore, the accuracy for medium and few class improves, whereas the accuracy for many class decreases.

Some examples of computing devices, such as computing device 200 may include non-transitory, tangible, machine readable media that include executable code that when run by one or more processors (e.g., processor 210) may cause the one or more processors to perform the processes of methods 300-400. Some common forms of machine readable media that may include the processes of methods 300-400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of training a neural network in connection with a projection head for object recognition in images, comprising:

receiving, at a neural network including an image encoder and a classifier, a training dataset of images including a first portion of images belonging to a first class and a second portion of images belonging to a second class;

sampling, by a class-agnostic sampler, a first image according to a first probability distribution that is uniform across the first portion of images and the second portion of images;

sampling, by a class-aware sampler, a second image according to a second probability distribution that is inversely proportional to a total number of images in the first portion or the second portion of images;

generating an interpolative image by a linear interpolation of the first image sampled by the class-agnostic sampler and the second image sampled by the class-aware sampler;

generating, by the image encoder of the neural network and subsequently by the projection head, an interpolative image embedding that is in a low-dimensional embedding space from the interpolative image;

generating, by the image encoder and subsequently by the classifier of the neural network, a predicted image class that the interpolative image belongs to;

computing an interpolative centroid contrastive loss based on a set of class centroids corresponding a set of classes in the training dataset and the interpolative image embedding;

training the image encoder of the neural network based at least in part on the interpolative centroid contrastive loss;

training the image encoder and the classifier of the neural network based on the predicted image class; and performing, by the trained image encoder and the trained classifier of the neural network, an image recognition task on an input image.

2. The method of claim 1, wherein the first portion of images has a greater number of images than the second portion of images thereby causing a tail-distribution of the second class.

3. The method of claim 1, wherein the second image is sampled by:

sampling the second class according to the second probability that is computed inversely proportional to a number of images in the second portion of images; and selecting the second image from the sampled second class uniformly.

4. The method of claim 1, further comprising:

computing, for each class, a class centroid based on an exponential moving average of low-dimensional embeddings for samples that belong to the respective class; and computing a class centroid prediction distribution indicating a corresponding probability that a specific class centroid is retrieved when the specific class centroid is queried by the interpolative image, based on a set of class centroids and the interpolative image embedding.

5. The method of claim 4, wherein the interpolative centroid contrastive loss is computed based on the class centroid prediction distribution.

6. The method of claim 1, further comprising:

generating, by a first copy of the image encoder and a first copy of the classifier, a first classification output from the first image; and computing a first classification loss based on a first cross entropy loss of the first classification output.

7. The method of claim 6, further comprising:

generating, by a second copy of the image encoder and a second copy of the classifier, a second classification output from the second image, wherein the second copy of the image encoder shares one or more encoder parameters with the first copy of the image encoder, and the second copy of the classifier shares one or more classifier parameters with the first copy of the classifier; and computing a second classification loss based on a second cross entropy loss of the second classification output.

8. The method of claim 7, further comprising:

computing a sum of the first classification loss, the second classification loss and the interpolative centroid contrastive loss; and update the neural network based on the computed sum via backpropagation.

9. The method of claim 7, further comprising:

updating the first copy of the image encoder and the first copy of the classifier by the first classification loss without the projection head for a first number of training epochs; and updating the neural network and the projection head based on the sum after the first number of training epochs.

10. The method of claim 7, further comprising:

rebalancing the first classifier towards the second class by a KL-divergence distillation loss that is computed based on class logits produced by the first classifier at different training stages.

11. The system of claim 1, wherein the processor further reads instructions from the memory to perform:

computing, for each class, a class centroid based on an exponential moving average of low-dimensional embeddings for samples that belong to the respective class; and computing a class centroid prediction distribution indicating a corresponding probability that a specific class centroid is retrieved when the specific class centroid is queried by the interpolative image, based on a set of class centroids and the interpolative image embedding.

12. The system of claim 11, wherein the interpolative centroid contrastive loss is computed based on the class centroid prediction distribution.

13. A system for training a neural network for object recognition in images, the system comprising:

a memory that stores a neural network comprising an image encoder and a classifier, and a projection head and a plurality of processor-executed instructions;

a data interface that receives a training dataset of images including a first portion of images belonging to a first class and a second portion of images belonging to a second class; and a processor that reads instructions from the memory to perform:

sampling, by a class-agnostic sampler, a first image according to a first probability distribution that is uniform across the first portion of images and the second portion of images;

sampling, by a class-aware sampler, a second image according to a second probability distribution that is inversely proportional to a total number of images in the first portion or the second portion of images;

generating an interpolative image by a linear interpolation of the first image sampled by the class-agnostic sampler and the second image sampled by the class-aware sampler;

generating, by the image encoder of the neural network and subsequently by the projection head, an interpolative image embedding that is in a low-dimensional embedding space from the interpolative image;

generating, by the image encoder and subsequently by the classifier of the neural network, a predicted image class that the interpolative image belongs to;

computing an interpolative centroid contrastive loss based on a set of class centroids corresponding a set of classes in the training dataset and the interpolative image embedding;

training the image encoder of the neural network based at least in part on the interpolative centroid contrastive loss;

training the image encoder and the classifier of the neural network based on the predicted image class; and performing, by the trained image encoder and the trained classifier of the neural network, an image recognition task on an input image.

14. The system of claim 13, wherein the first portion of images has a greater number of images than the second portion of images thereby causing a tail-distribution of the second class.

15. The system of claim 13, wherein the second image is sampled by:

sampling the second class according to the second probability that is computed inversely proportional to a number of images in the second portion of images; and selecting the second image from the sampled second class uniformly.

16. The system of claim 13, wherein the processor further reads instructions from the memory to perform:

generating, by a first copy of the image encoder and a first copy of the classifier, a first classification output from the first image; and computing a first classification loss based on a first cross entropy loss of the first classification output.

17. The system of claim 16, wherein the processor further reads instructions from the memory to perform:

generating, by a second copy of the image encoder and a second copy of the classifier, a second classification output from the second image, wherein the second copy of the image encoder shares one or more encoder parameters with the first copy of the image encoder, and the second copy of the classifier shares one or more classifier parameters with the first copy of the classifier; and computing a second classification loss based on a second cross entropy loss of the second classification output.

18. The system of claim 17, wherein the processor further reads instructions from the memory to perform:

computing a sum of the first classification loss, the second classification loss and the interpolative centroid contrastive loss; and update the neural network based on the computed sum via backpropagation.

19. The system of claim 17, wherein the processor further reads instructions from the memory to perform:

updating the first copy of the image encoder and the first copy of the classifier by the first classification loss without the projection head for a first number of training epochs; and updating the neural network and the projection head based on the sum after the first number of training epochs.

20. A computer-readable non-transitory medium storing a plurality of processor-executable instructions for training a neural network in connection with a projection head for object recognition in images, the processor-executable instructions executed by a processor to perform operations comprising:

receiving, at a neural network including an image encoder and a classifier, a training dataset of images including a first portion of images belonging to a first class and a second portion of images belonging to a second class;

sampling, by a class-agnostic sampler, a first image according to a first probability distribution that is uniform across the first portion of images and the second portion of images;

sampling, by a class-aware sampler, a second image according to a second probability distribution that is inversely proportional to a total number of images in the first portion or the second portion of images;

generating an interpolative image by a linear interpolation of the first image sampled by the class-agnostic sampler and the second image sampled by the class-aware sampler;

generating, by the image encoder of the neural network and subsequently by the projection head, an interpolative image embedding that is in a low-dimensional embedding space from the interpolative image;

generating, by the image encoder and subsequently by the classifier of the neural network, a predicted image class that the interpolative image belongs to;

computing an interpolative centroid contrastive loss based on a set of class centroids corresponding a set of classes in the training dataset and the interpolative image embedding;

training the image encoder of the neural network based at least in part on the interpolative centroid contrastive loss;

training the image encoder and the classifier of the neural network based on the predicted image class; and performing, by the trained image encoder and the trained classifier of the neural network, an image recognition task on an input image.

* * * * *